United States Patent
Xiao et al.

(10) Patent No.: US 11,003,497 B2
(45) Date of Patent: May 11, 2021

(54) MANAGING RESOURCE ALLOCATION IN HIERARCHICAL QUOTA SYSTEM

(71) Applicant: EMC IP Holding Company LLC, Hopkinton, MA (US)

(72) Inventors: Chunjun Xiao, Shanghai (CN); Ming Yi, Shanghai (CN); Zhao Hui Guo, Shanghai (CN)

(73) Assignee: EMC IP Holding Company LLC, Hopkinton, MA (US)

(*) Notice: Subject to any disclaimer, the term of this patent is extended or adjusted under 35 U.S.C. 154(b) by 602 days.

(21) Appl. No.: 14/584,337

(22) Filed: Dec. 29, 2014

(65) Prior Publication Data

US 2015/0188840 A1 Jul. 2, 2015

(30) Foreign Application Priority Data

Dec. 31, 2013 (CN) .......................... 201310756078.1

(51) Int. Cl.
*G06F 15/173* (2006.01)
*G06F 9/50* (2006.01)

(52) U.S. Cl.
CPC .......... *G06F 9/50* (2013.01); *G06F 2209/504* (2013.01); *Y02D 10/22* (2018.01)

(58) Field of Classification Search
CPC ..... H04L 47/76; H04L 47/782; H04L 47/821; G06F 9/50; G06F 2209/504; G06F 9/5083; Y02B 60/142
USPC ................................................. 709/226, 223
See application file for complete search history.

(56) References Cited

U.S. PATENT DOCUMENTS

| | | | | |
|---|---|---|---|---|
| 5,421,011 A * | 5/1995 | Camillone | ............... | G06F 9/468 718/104 |
| 5,467,352 A * | 11/1995 | Cidon | ................... | H04L 12/433 370/452 |
| 7,716,275 B1 * | 5/2010 | Nagaralu | ............... | G06F 9/5011 709/203 |
| 7,783,666 B1 * | 8/2010 | Zhuge | ............... | G06F 17/30082 707/783 |
| 2005/0246705 A1 * | 11/2005 | Etelson | ...................... | G06F 8/70 718/100 |
| 2008/0244576 A1 * | 10/2008 | Kwon | ................... | G06F 9/5016 718/1 |
| 2011/0161973 A1 * | 6/2011 | Klots | ................ | G06F 17/30566 718/104 |

(Continued)

*Primary Examiner* — Wing F Chan
*Assistant Examiner* — Andrew Woo
(74) *Attorney, Agent, or Firm* — Krishnendu Gupta; Lesley Leonessa

(57) ABSTRACT

A method for managing resource allocation in a hierarchical quota system, comprising n layers of quota nodes, n being a positive integer greater than 1, and comprises at a first quota node in an $i^{th}$ layer of quota nodes, in response to receiving a resource allocation request from a user, determining whether an amount of requested resources exceeds a first quota; if the amount of requested resources does not exceed the first quota, determining whether the first node holds a quota delegation for the first quota node; if the first node holds the quota delegation, determining whether the amount of requested resources exceeds a second quota specified by the quota delegation for the first quota node; if the amount of requested resources does not exceed the second quota, allocating the requested resources to the user.

14 Claims, 6 Drawing Sheets

(56) References Cited

U.S. PATENT DOCUMENTS

| | | | | |
|---|---|---|---|---|
| 2012/0272237 A1* | 10/2012 | Baron | ............... | G06F 9/45558 |
| | | | | 718/1 |
| 2013/0305245 A1* | 11/2013 | Doddavula | ............ | G06F 9/50 |
| | | | | 718/1 |
| 2014/0032760 A1* | 1/2014 | Cohen | ............... | G06F 9/5011 |
| | | | | 709/226 |
| 2015/0103821 A1* | 4/2015 | Gilson | ............... | H04L 45/58 |
| | | | | 370/360 |

\* cited by examiner

MANAGING RESOURCE ALLOCATION IN HIERARCHICAL QUOTA SYSTEM

RELATED APPLICATION

This application claims priority from Chinese Patent Application No. CN201310756078.1 filed on Dec. 31, 2013 entitled "METHOD AND APPARATUS FOR MANAGING RESOURCE ALLOCATION IN HIERARCHICAL QUOTA SYSTEMS," which is herein incorporated by reference in entirety.

FIELD OF THE INVENTION

Embodiments of the present disclosure relate to hierarchical quota systems, and more particularly, for managing resource allocation in a hierarchical quota system.

BACKGROUND

In the field of computer, quota is a mechanism to track and control resource consumptions of each entity associated with a node, for the purpose of resource allocation book-keeping and prevention of excess resource consumption. The resource could be disk space, memory, CPU, etc. The entity could be a user, an organization, a process, etc. Examples of the node include a cloud service provider, clustered system, a single file system, a directory, and more. To track and control resource consumption by each entity on the node, typically quota attributes are configured for the node, and such a node configured with quota attributes is referred to as a quota node. A system formed by several quota nodes according to a well-defined dependency hierarchy is referred to as a hierarchical quota system. Examples of the hierarchical quota system include a distributed file system (consisting of several single file systems), a nested quota directory node (a quote directory contained in other quote directory), a cloud service system, etc.

FIG. 1 shows an exemplary architecture of a hierarchical quota system 100. Hierarchical quota system 100 as shown in FIG. 1 has a tree architecture, which comprises a quota node P 110, a quota node C1 111, a quota node C2 112, and a quota node CC3 113. Quota node P 110 is the parent node of quota node C1 111 and quota node C2 112, and quota node C1 111 is the parent node of quota node CC3 113. In the present application, however, quota node P 110 is also referred to as an upper-layer node directly associated with quota node C1 111 and quota node C2 112, and quota node C1 111 is referred to as an upper-layer node directly associated with quota node CC3 113. It may be understood that hierarchical quota system 100 may further comprise an upper-layer node directly associated with quota node P 110 and a lower-layer node directly associated with quota node CC3 113. For the purpose of simplifying illustration, FIG. 1 only shows part of the hierarchical quota system.

In the hierarchical quota system, each quota node is responsible to track and control the resource allocation by itself, on all lower-layer quota nodes directly or indirectly associated therewith. Each quota node has a quota database (DB) to track and control resource allocation of users who consume resources on a respective quota node tree. For each user to whom resources are allocated, a quota DB record is created in the quota DB. Table 1 shows an exemplary structure of a quota DB record for a hierarchical quota system.

TABLE 1

| Id | Limit_cfg | UseCount[ ]: S, C1, C2, . . . , Cn |
| --- | --- | --- |

As shown in Table 1, the quota DB record for the hierarchical quota system at least consists of three fields:

1) Id: user identifier field, indicating the user from whom this quota DB record is created;

2) Limit_cfg: resource upper-limit field, indicating resource upper-limit that can be allocated to this user on a current quota node (e.g., quota node P 110 in FIG. 1) and its child quota node trees (such as quota node trees with a root of quota node C1 111, with a root of quota node C2 112, . . . with a root of Quota node Cn, respectively);

3) UseCount: resource use count field, indicating the amount of resources actually allocated to this user on a current quota node (e.g., quota node P 110 in FIG. 1) and its child quota node trees (such as quota node trees with a root of quota node C1 111, with a root of quota node C2 112, . . . with a root of Quota node Cn, respectively). For example, in the hierarchical quota system shown in FIG. 1, quota node P 110 is responsible to track and control the resource consumption on itself and on its child quota node trees, i.e., a child quota node tree (including quota node CC3 113) with the root of C1 111 and a child quota node tree with the root of quota node C2 112, and information on the resource use amount is recorded in the UseCount field in Table 1. It is noted that content in the UseCount field is a vector as shown in Table 1.

In the prior art, when a user 114 as shown in FIG. 1 requests resources on quota node C1 111, all nodes in the path from the top quota node to quota node C1 111 need to check the Limit_cfg field in their quota DB records, i.e., the amount of resources requested by user 114 is compared with a value of the Limit_cfg field to determine whether or not resources requested by user 114 can be allocated to user 114. In addition, after determining that resources being requested can be allocated to user 114, all nodes on the path from the top node to quota node C1 111 need to update the Limit_cfg field and the UseCount field in their quota DB records, to track and control the resource consumption of user 114 in the whole system and satisfy a constraint set configured by the administrator. This will stimulate an inter-node communication storm and slow down the system throughput, especially when the quota nodes reside on different cabinets or geographical locations.

FIG. 2 shows a sequence diagram of an existing method for resource allocation in a typical hierarchical quota system. This figure shows the flow of resource allocation when user 114 as shown in FIG. 1 requests resources on quota node C1 111.

In step S201, user 114 sends a resource allocation request to quota node C1 111, requesting quota node C1 111 to allocate resources to itself.

In step S202, quota node C1 111 checks its quota DB to determine if the resource allocation request should be approved. Step S202 may further comprise:

a. Quota node C1 111 will look up its quota DB record for user 114.

b. If no such a quota DB record for user 114 exists, the check at quota node C1 111 is passed and the flow goes to step S203.

c. If the record exists, quota node C1 111 will compare the amount of requested resources with a value in the Limit_cfg field and determine whether or not the resources can be granted. If the amount of requested resources does not exceed the value in the Limit-cfg field and it is determined the resources can be granted, then the flow proceeds to a check in step S203; otherwise, the request for resources is denied.

In step S203, when the local check at quota node C1 111 is passed, quota node C1 111 contacts its parent quota node P 110 to request the parent quota node to check its quota DB and update its local quota DB after the check is passed.

In step S204, quota node P 110 checks its quota DB to determine whether to approve the request. Specific steps are the same as steps a, b and c executed by quota node C1 111 in step S202 disclosed above.

If the check at quota node P 110 is passed, then in step S205, quota node P 110 updates the UseCount field (i.e., UseCount[C1]) in its quota DB record to track the resource consumption of user 114, and subtracts the amount of allocated resources from the Limit_cfg field.

In step S206, quota node P 110 returns a check result to quota node C1 111.

If both the checks at quota nodes P 110 and C1 111 are passed, then in step S207, quota node C1 111 updates the UseCount field (i.e., UseCount[S]) in its quota DB record to track the resource consumption of user 114, and subtracts the amount of allocated resources from the Limit_cfg field.

In step S208, quota node C1 111 allocates requested resources to user 114.

In step S209, quota node C1 111 grants requested resources to user 114.

It should be noted that when quota node P 110 is not the root quota node in hierarchical quota system 100, i.e., quota node P 110 still has its ancestor nodes, after the check at quota node P 110 in step S204 is passed, it is required that there is a check and update at all ancestor nodes of quota node P 110. That is, only after checks at all quota nodes on the path from the root quota node to quota node C1 111 in hierarchical quota system are passed and corresponding quota DB records are updated. quota node C1 111 will approve the resource allocation request of user 114. Therefore, this will stimulate an inter-node communication storm and result in slowing down the system throughput.

SUMMARY OF THE INVENTION

Therefore, there is a need for a resource allocation method capable of reducing communication among quota nodes in a hierarchical quota system during resource allocation in order to improve the system throughput.

Accordingly embodiments of the present disclosure relate to an apparatus, a computer program product and method for managing resource allocation in a hierarchical quota system, the hierarchical quota system comprising n layers of quota nodes from top to bottom, n being a positive integer greater than 1, the method comprising: at a first quota node in an $i^{th}$ layer of quota nodes, in response to receiving a resource allocation request from a user, determining whether an amount of requested resources exceeds a first quota that is set by a system administrator at the first quota node, wherein "" is a positive integer that is more than 1 and less than or equal to "n"; if the amount of requested resources does not exceed the first quota, determining whether the first node holds a quota delegation for the first quota node; if the first node holds the quota delegation, determining whether the amount of requested resources exceeds a second quota specified by the quota delegation for the first quota node; and if the amount of requested resources does not exceed the second quota, allocating the requested resources to the user.

According to a further embodiment of the present disclosure the method wherein allocating requested resources to the user includes subtracting an amount of allocated resources from the first quota and the second quota so as to update the first quota and the second quota; and updating the amount of resources allocated to the user.

According to a further embodiment of the present disclosure if the first node does not hold the quota delegation, creating a first quota delegation application request for obtaining the quota delegation, the first quota delegation application request at least containing an identifier of the user, a first minimum share requested value and a first maximum share requested value, wherein the first minimum share requested value indicates the amount of resources requested by the user, and the first maximum share requested value indicates the first quota; and sending the first quota delegation application request to a second quota node in an ($i^{th}$-1) layer of quota nodes that is directly associated with the first quota node.

According to a further embodiment of the present disclosure the method further includes (a) in response to receiving the request, determining whether the second quota node holds a quota delegation for the second quota node; (b) if the second quota node does not hold the quota delegation for the second quota node, sending a request for obtaining the quota delegation for the second quota node to a third quota node in an ($i^{th}$-2) layer of quota nodes that is directly associated with the second quota node; and (c) if the second quota node holds the quota delegation for the second quota node, sending a response to the first quota node in order to grant the quota delegation for the first quota node.

According to a further embodiment of the present disclosure the step (b) disclosed above is executed iteratively until the step (b) has been executed for a quota node in a first layer of quota nodes that is associated with the second quota node; and wherein the quota nodes in the first layer cut, in response to quota delegation application requests from respective quota nodes in a second layer of quota nodes associated with the quota nodes in the first layer, shares requested delegation application requests by the quota from the first quota.

According to a further embodiment of the present disclosure a quota database record for a respective user is maintained at each quota node in the "n" layer of quota nodes, the quota database record at least comprising: a user identifier field configured to identify a user to which the quota database record corresponds; a quota field comprising the first quota set by the system administrator and the second quota specified by the quota delegation for the first quota node, the second quota being less than or equal to the first quota; a resource use count field configured to be a vector field to indicate amount of resources actually allocated on a current quota node and quota nodes in a lower layer associated with the current quota node; a delegation flag field configured to be a vector field to indicate whether a respective quota delegation has been granted to each quota node in the lower layer directly associated with the current quota node, and status of the respective quota delegation; and a reserved share field configured to be a vector field to indicate shares reserved for each quota node in the lower layer holding the quota delegation in the first quota and the second quota.

According to a further embodiment of the present disclosure the status of the quota delegation comprises one of un-granted status, granted status and revoked status.

According to a further embodiment of the present disclosure wherein determining whether the second quota node has a quota delegation for the second quota node comprises:

looking up a quota database record for the user at the second quota node to determine whether a quota field of the quota database record for the user comprises a valid second quota.

According to a further embodiment of the present disclosure the step (c) disclosed above comprises: if determining the quota field of the quota database record for the user at the second quota node comprises the valid second quota, cutting shares reserved for the first quota node from the first quota and the second quota, the reserved shares being greater than or equal to the first minimum share requested value and less than or equal to the first maximum share requested value.

According to a further embodiment of the present disclosure wherein the step (c) disclosed above further comprises: creating a first temporary quota database record, the first temporary quota database record at least contains the identifier of the user and the shares reserved for the first quota node; and sending the first temporary quota database record to the first quota node.

According to a further embodiment of the present disclosure in response to receiving the first temporary quota database record, caching the shares reserved for the first quota node in the quota field of the quota database record for the user as a second quota for the quota field.

Yet a further embodiment of the present disclosure comprises determining whether or not the amount of requested resources exceeds the second quota in the quota field of the quota database record for the user at the first quota node; if the amount of requested resources exceeds the second quota, determining whether the first quota node has granted quota delegations to quota nodes in an $i^{th}+1$ layer of quota nodes that are directly associated with the first quota node; and if the first quota node does not grant quota delegation to the quota nodes in the $i^{th}+1$ layer, sending from the first quota node to the second quota node a first quota delegation adjustment request for adjusting the second quota; the first quota delegation adjustment request at least containing an identifier of the user, a second minimum share requested value and a second maximum share requested value; wherein the second minimum share requested value is a difference between the amount of resources requested by the user and the second quota in the quota field of the quota database record for the user at the first quota node, and the second maximum share requested value is a difference between the second quota and the first quota in the quota field of the quota database record for the user at the first quota node.

According to a further embodiment of the present disclosure in response to receiving the first quota delegation adjustment request, the second quota node performs the following steps: (d) checking a delegation flag field in a quota database record for the user at the second quota node to determine a status of the quota delegation for the first quota node; and (e) if the status of the quota delegation for the first quota node is a granted status, checking whether a second quota in a quota field of a quota database record for the user at the second quota node is greater than or equal to the second minimum share requested value requested by the first quota delegation adjustment request; and (f) if the status of the quota delegation for the first quota node is a revoked status, sending a first quota delegation revocation request to the first quota node, the first quota delegation revocation request at least containing the identifier of the user.

According to a further embodiment of the present disclosure if the second quota in the quota field of the quota database record for the user at the second quota node is greater than or equal to the second minimum share requested value, at the second quota node: amending shares reserved for the first quota node for the first quota delegation adjustment request from the second quota and the first quota in the quota field in the quota database record for the user; adding the reserved shares to a sub-field for the first quota node in the reserved share field of the quota database record; and sending to the first quota node a response to the first quota delegation adjustment request, the response at least containing the shares reserved for the first quota node.

According to yet a further embodiment of the present disclosure if the second quota in the quota field of the quota database record for the user at the second quota node is less than the second minimum share requested value, recalling quota delegations from one or more quota nodes other than the first quota node in a lower layer of quota nodes which are directly associated with the second quota node, until the second quota is greater than or equal to the second minimum share value.

According to a further embodiment of the present disclosure recalling a quota delegation from any of more quota nodes in the lower layer which are directly associated with the second quota node comprises: sending a first quota delegation recalling request from the second quota node to a fourth quota node in the lower layer of quota nodes that may be directly associated with the second quota node.

According to a further embodiment of the present disclosure in response to receiving the first quota delegation recalling request, performing the following steps at the fourth quota node: checking a delegation flag field in a quota database record for the user at the fourth quota node to determine whether respective quota delegations have been granted to quota nodes in the lower layer of quota nodes; if the respective quota delegations have been granted to the quota nodes in the lower layer, recalling all of the respective quota delegations; resetting a second quota in the quota field of the quota database record for the user at the fourth quota node as being invalid; and sending a quota delegation recalling response to the second quota node, the quota delegation recalling response at least containing a total amount of resources consumed by the user on the fourth quota node and all child nodes associated therewith.

According to a further embodiment of the present disclosure in response to receiving the quota delegation recalling response, updating, by the second quota node, a quota database record for the user at the second quota node, includes updating the total amount of resource consumption contained in the quota delegation recalling response to sub-fields corresponding to the fourth quota node in a resource use count field of a quota database record for the user; and adding shares reserved for a quota delegation for the fourth quota node, from which the total amount of resource consumption has been subtracted, to the first quota and the second quota in the quota field of the quota database record for the user at the second quota node.

According to a further embodiment of the present disclosure further comprises recalling, by the second quota node, all quota delegations other than the quota delegation held by the first quota node from the quota nodes in the lower layer that are directly associated with the second quota node; determining whether or not a second quota in a quota field of a quota database record for the user at the second quota node is less than the second minimum share requested value; and if the second quota is less than the second minimum share requested value, checking the first quota of the quota field in the quota database record for the user at the second quota node.

A further embodiment of the present disclosure comprises (g) if the first quota is less than the second minimum share requested value requested by the first quota delegation adjustment request, rejecting the first quota delegation adjustment request; and (h) if the first quota is greater than or equal to the second minimum share requested value requested by the first quota delegation adjustment request, sending a second quota delegation adjustment request from the second quota node to a third quota node in an $i^{th}$-2 layer of quota nodes which are directly associated with the second quota node.

According to a further embodiment of the present disclosure the step (h) is executed iteratively until the step (h) has been executed for quota nodes in the first layer of quota nodes which are associated with the second quota node.

A further embodiment of the present disclosure comprises in response to receiving the first quota delegation revocation request: recalling quota delegations from all the quota nodes in the $i^{th}$+1 layer that may be directly associated with the first quota node; resetting the second quota in the quota field of the quota database record for the user at the first quota node as being invalid; creating a second temporary quota database record, the second temporary quota database record at least containing the identifier of the user and a total amount of resources consumed by the user on the first quota node and all the quota nodes in the $i^{th}$+1 layer that may be directly associated with the first quota node; and sending the second temporary quota database record to the second quota node.

According to a further embodiment of the present disclosure, in response to receiving the second temporary quota database record, revising the quota database record for the user at the second quota node. According to yet a further embodiment of the present disclosure in response to a quota delegation expiring, renewing, by the first quota node, a quota delegation for the second quota node in an $i^{th}$-1 layer which is directly associated with the first quota node.

According to a further embodiment of the present disclosure renewing the quota delegation comprises: creating a third temporary quota database record at the first quota node, wherein the third temporary quota database record at least contains an identifier of the user and a total amount of resources consumed by the user on the first quota node and all quota nodes in an $i^{th}$+1 layer which are directly associated with the first quota node; and sending the third temporary quota database record to the second quota node. According to the various embodiments of the present disclosure, it is possible to reduce communication among quota nodes in a hierarchical quota system during resource allocation, thereby enhancing the system throughput.

BRIEF DESCRIPTION OF THE DRAWINGS

Through the detailed description of some embodiments of the present disclosure in the accompanying drawings, the above and other objects, features and advantages of the present disclosure will become more apparent, wherein the same reference generally refers to the same components in the embodiments of the present disclosure. In the accompanying drawings.

DETAILED DESCRIPTION OF EMBODIMENTS

Figure 1:
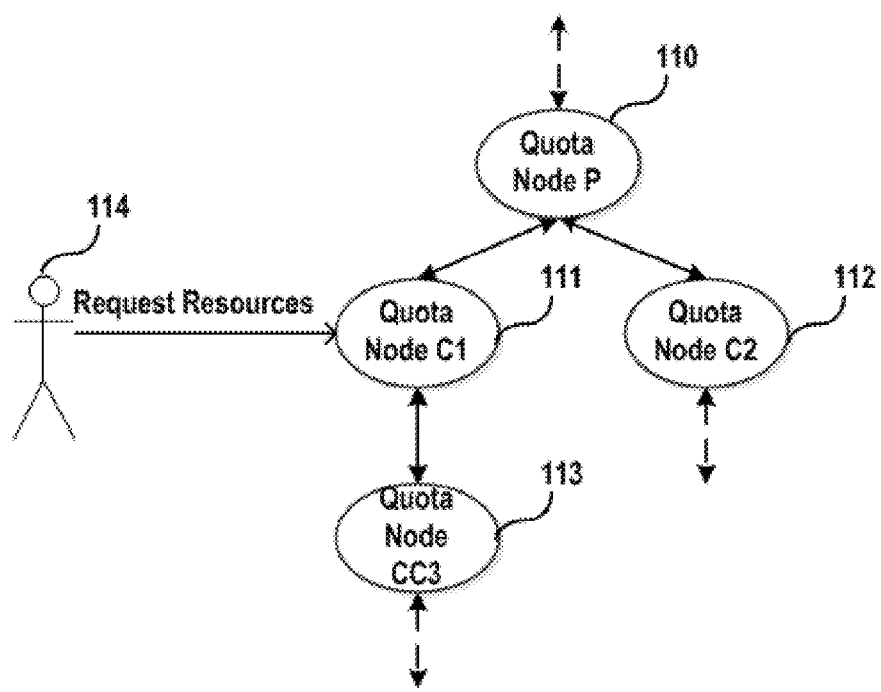
FIG. 1 shows an exemplary architecture of a hierarchical quota system.

Hereinafter, various exemplary embodiments of the present disclosure will be described in detail with reference to the drawings. The flowcharts and block diagrams in the figures illustrate potential realizable architecture, function, and operation of the method, computer program product and system according to various embodiments of the present disclosure. It should be noted that each block in the flowcharts or block diagrams may represent a module, a program segment, or a part of code, which may contain one or more executable instructions for implementing logic functions as prescribed in various embodiments. It should also be noted that, in some alternative implementations, the functions indicated in the blocks may also occur in an order different from what is indicated in the drawings. For example, two blocks shown consecutively may be performed in parallel substantially or in an inverse order, dependent on the functions involved. It should also be noted that each block in the flow charts and/or block diagrams and a combination of the blocks in flow charts and/or block diagrams may be implemented by a dedicated hardware-based system for executing prescribed functions or operations or may be implemented by a combination of dedicated hardware and computer instructions.

One embodiment of the present disclosure provides a method for managing resource allocation in a hierarchical quota system. One of principles of the method is that an upper-layer node in the hierarchical quota system grants respective quota delegations to lower-layer nodes directly associated with the upper-layer node, so that each of the lower-layer nodes, upon receiving a resource allocation request from a user, determines whether or not an amount of requested resources exceeds the quota specified by the respective quota delegation; if not, the respective lower-layer node may decide by itself to allocate requested resources to the user and update a local quota DB record for the user. According to the resource allocation method of the present disclosure, as long as the amount of requested resources does not exceed the quota specified by the respective quota delegation, the respective lower-layer node may no longer have to contact the upper-layer node associated with itself or requests the upper-layer node to check the local quota DB so as to determine whether to allocate requested resources to the user. Therefore, this reduces the communication between quota nodes and improves the system throughput.

Figure 3:
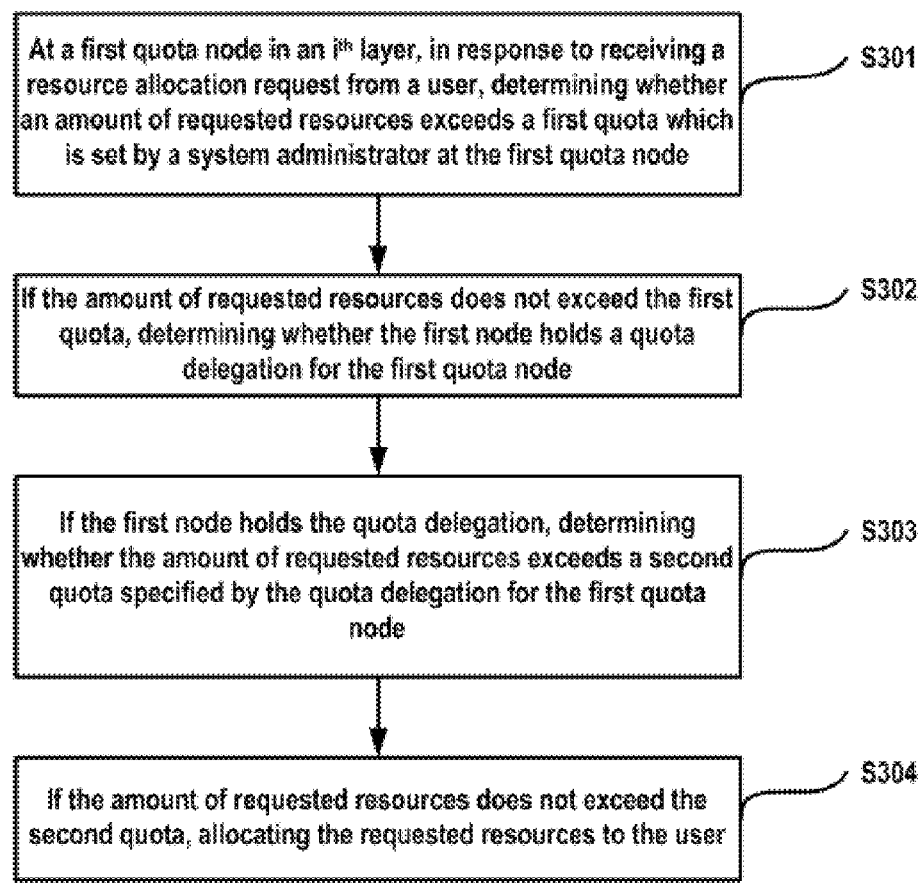
FIG. 3 shows an exemplary flowchart of a method for managing resource allocation in a hierarchical quota system according to one embodiment of the present disclosure.

FIG. 3 shows an exemplary flowchart of a method 300 for managing resource allocation in a hierarchical quota system according to one embodiment of the present disclosure. The hierarchical quota system comprises "n" layers of quota nodes from top to bottom, e.g., comprising an $n^{th}$-layer of quota nodes at the bottom, an $n^{th}$-1 layer of quota node . . . , and a first layer of quota nodes at the top. According to particular applications, "n" may be any appropriate positive integer greater than 1. Examples of the hierarchical quota management system include a distributed file system (consisting of several single file systems), a nested quota directory node (a quote directory contained in other quote directory), and a cloud service system. As a specific example, the hierarchical quota management system has a tree-shaped architecture as illustrated in FIG. 1.

In step S301, at a first quota node in an $i^{th}$ layer of quota nodes, in response to receiving a resource allocation request from a user, it is determined whether an amount of requested resources exceeds a first quota that may be set by a system administrator at the first quota node, where "" is a positive integer that is more than 1 and less than or equal to n. The quota delegation indicates that the quota node receiving the resource allocation request from the user is granted to make a decision as to whether to allocate requested resources to the user, without needing to communicate with its associated upper-layer quota node for requesting the upper-layer quota node to decide whether to allocate requested resources to the user. Where the hierarchical quota management system has a tree architecture as shown in FIG. 1, the first quota node in the $i^{th}$ layer of quota nodes may be, for example, any one of quota nodes 110 to 113 shown in FIG. 1.

If it is determined in step S301 that the amount of requested resources does not exceed the first quota set for the first quota node by the system administrator, the flow proceeds to step S302 to determine whether the first quota node holds a quota delegation for the first node. It may be understood that the first quota set for the first quota node by the system administrator is an upper limit of resources that the system allows to be allocated to the user by the first quota node. Therefore, if it is determined in step S301 the amount of requested resources exceeds the first quota set for the first quota node by the system administrator, the user's resource allocation request is denied (not shown).

If it is determined in step S302 that the first quota node holds the quota delegation for the first quota node, then the flow proceeds to step S303 to further determine whether the amount of requested resources exceeds a second quota specified by the quota delegation for the first quota node.

In step S304, if the amount of requested resources does not exceed the second quota specified by the quota delegation for the first quota node, then requested resources are allocated to the user.

In one embodiment of the present disclosure if it is determined in step S302 the first quota node does not hold the quota delegation for the first quota node, then sending a request for obtaining the quota delegation to a second quota node in an $i^{th}$-1 layer of quota nodes that is directly associated with the first quota node. Where the hierarchical quota management system has a tree architecture as shown in FIG. 1, when the first quota node in the $i^{th}$ layer of quota nodes is quota node C1 111 as shown in FIG. 1, the second quota node in the $i^{th}$-1 layer of quota nodes that is directly associated with the first quota node may be quota node P 110 as shown in FIG. 1.

In one embodiment of the present disclosure, the method further comprises: (a) in response to receiving the request, determining whether the second quota node holds a quota delegation for the second quota node; (b) if the second quota node does not hold the quota delegation for itself, and then sending a request for obtaining a quota delegation for the second quota node to a third quota node in an $i^{th}$-2 layer of quota nodes that is directly associated with the second quota node; (c) if the second quota node holds the quota delegation for itself, sending a response to the first quota node to grant a quota delegation for the first quota node.

In one embodiment of the present disclosure, the step (b) above is executed iteratively until the step (b) has been executed for a quota node in a first layer of quota nodes that is associated with the second quota node.

In one embodiment of the present disclosure, a quota DB record for a respective user is maintained at each of the "n" layers of quota nodes. Table 2 shows an exemplary structure of a quota DB record according to one embodiment of the present disclosure.

TABLE 2

| Id | Limit0_cfg, Limit1_cached | UseCount[S, C1, C2, . . . , Cn] | DelegationFlag[C1, C2, . . . , Cn] | ReservedShare[C1, C2, . . . , Cn] |
|---|---|---|---|---|

As illustrated in Table 2, a quota DB record according to one embodiment of the present disclosure at least comprises the following fields:

1) Id: user identifier field, indicating a user for whom this quota DB record is created;

2) quota field: consisting of a first quota Limit0_cfg set by a system administrator and a second quota Limit1_cached specified by a quota delegation; and Limit0_cfg is always greater than or equal to Limit1_cached;

3) UseCount[S, C1, C2, . . . , Cn]: resource use count field, which is a vector field and configured to indicate the amount of resources actually allocated on a current quota node (S) and lower-layer quota nodes (C1, C2, . . . , Cn) associated with the current quota node; the UseCount[S, C1, C2, . . . , Cn] field further includes sub-fields UseCount[S], UseCount[C1], . . . , UseCount[Cn] corresponding to the current quota node (S) and various lower-layer quota nodes (C1, C2, . . . , Cn); and if these lower-layer quota nodes have quota delegations, corresponding sub-fields are not updated in real time. For example, if quota node C1 has a quota delegation, UseCount[1] does not represent the amount of resources consumed in real time by the user on node C1.

4) DelegationFlag[C1, C2, . . . , Cn]: delegation flag field, which is a vector field and configured to indicate whether a quota delegation may have been granted to each lower-layer quota node (C1, C2, . . . , Cn) directly associated with the current quota node, and indicate status of the quota delegation. The status of the quota delegation includes ungranted, granted, and revoked. For example, it may be set in advance when the value of C1 is 0, it is indicated no quota delegation is granted to lower-layer quota node C1, when the value of C1 is 1, it is indicated a quota delegation has been granted to lower-layer quota node C1, and when the value of C1 is 2, it is indicated a quota delegation granted to lower-layer quota node C1 has been unilaterally revoked by the current quota node. The DelegationFlag[C1, C2, ..., Cn] field consists of sub-fields DelegationFlag[C1], DelegationFlag[C2], . . . , DelegationFlag[Cn] corresponding to various lower-layer quota nodes (C1, C2, . . . , Cn).

5) ReservedShare[C1, C2, Cn]: reserved share field, which is a vector field and configured to indicate shares that are reserved among first quota Limit0_cfg and second quota Limit1_cached for each lower-layer quota node (C1, C2, . . . , Cn) with a quota delegation. The ReservedShare

[C1, C2, . . . , Cn] field includes sub-fields ReservedShare [C1], ReservedShare [C2] , . . . , ReservedShare [Cn] corresponding to various lower-layer quota nodes (C1, C2, . . . , Cn).

Detailed description is presented below to the process of granting a quota delegation by taking the hierarchical quota system shown in FIG. 1 as an example.

Quota Delegation Granting

Where the hierarchical quota management system has a tree architecture as shown in FIG. 1, a first quota node in the $i^{th}$ layer of quota nodes is quota node C1 111 as shown in FIG. 1, and a second quota node in the $i^{th}$-1 layer of quota nodes that is directly associated with the first quota node is quota node P 110 as shown in FIG. 1. When the user sends a resource allocation request to quota node C1 111, following operations will be performed as disclosed below.

1) Quota node C1 111 looks up a local quota DB for a quota DB record for user 114 sending the resource allocation request to quota node C1 111, and checks in the quota DB record for user 114 a first quota Limit0_cfg that has been configured for user 114 on quota node C1 111 by the administrator.
   a. If the amount of requested resources exceeds the first quota Limit0_cfg, the resource allocation request is rejected;
   b. If the amount of requested resources does not exceed first quota Limit0_cfg, the check on first quota Limit0_cfg is passed, and a check on a second quota Limit1_cached is conducted.
2) Quota node C1 111 checks whether it holds a valid second quota Limit1_cached, i.e., checks whether quota node C1 111 holds a quota delegation from quota node P 110.
   a. If quota node C1 111 holds a quota delegation from quota node P 110, quota node C1 111 conducts a check on second quota Limit1_cached as to be described in step 6) below;
   b. If quota node C1 111 holds no quota delegation from quota node P 110, quota node C1 111 sends to quota node P 110 a request for obtaining a quota delegation. The request at least includes a user identifier of user 114, a minimum share requested value and a maximum share requested value. The minimum share requested value may be the amount of resources currently requested by user 114, and the maximum share requested value may be the first quota Limit0_cfg. Thereby, it is ensured Limit1_cached is always less than or equal to Limit0_cfg.
3) When quota node C1 111 sends to quota node P 110 a request for obtaining a quota delegation;
   a. Quota node P 110 may perform the following operations.
      i. Quota node P 110 determines whether the quota node P 110 holds a quota delegation from an upper-layer quota node that is directly associated with the quota node P 110 (not shown in FIG. 1). Specifically, quota node P 110 looks up a quota DB record for user 114 in a local quota DB, and checks in the quota DB record for user 114 whether it holds a valid second quota Limit1_cached. If quota node P 110 holds no quota delegation, it sends a request for obtaining a quota delegation to an upper-layer quota node that is directly associated with the quota node P 110. This step is executed iteratively until a quota node in the top layer that is associated with quota node P 110 has been accomplished. The quota node in the top layer always decreases shares from its first quota Limit0_cfg for quota delegation requests from quota nodes in a second layer. In response to obtaining a quota delegation from a directly-associated upper-layer quota node, quota node P 110 sets a second quota Limit1_cached in a local quota DB record for user 114, i.e., second quota Limit1_cached becomes valid.
      ii. With the first quota Limit0_cfg and valid second quota Limit1_cached, quota node P 110 determines reserved shares for the quota delegation of quota node C1 111 according to the minimum and maximum share requested values in the quota delegation request of quota node C1 111. The reserved shares must be greater than or equal to the minimum share requested value and less than or equal to the maximum share requested value and less than or equal to second quota Limit1_cached.
      iii. Quota node P 110 subtracts the reserved shares for quota node C1 111 from Limit0_cfg and Limit1_cached in the local quota DB record for user 114.
      iv. Quota node P 110 stores the reserved shares for quota node C1 111 in the ReservedShare[C1] field in the local quota DB record for user 114.
      v. Quota node P 110 sets the DelegationFlag[C1] field in the local quota DB record for user 114 to be granted, thereby indicating that a quota delegation has been granted to quota node C1 111.
   b. With the reserved shares, quota node P 110 creates a first temporary quota DB record having the following three fields as shown in Table 3.

TABLE 3

| Id | Limit1_cached | UseCount |
|---|---|---|

Id: user identifier field, indicating for which user the first temporary quota DB record is created;
Limit1_cached: quota field, indicating the quota share that is reserved for a first quota node (e.g., quota node C1 111) among i layer quota nodes by a second quota node (e.g., quota node P 110) among i-1 layer quota nodes that is directly associated with the first quota node;
UseCount: resource use count field, indicating the amount of resources allocated to a user (e.g., user 114) by the first quota node (e.g., quota node C1 111) among i layer quota nodes; this field may use a default value or is not filled.

It should be understood that the value of the Limit1_cached in the first temporary quota DB record for user 114 may be equal to the value of the ReservedShare[C1] in the local quota DB record of quota node P 110 for user 114.

In addition, it may be understood that the value of second quota Limit1_cached in the quota field of the local quota DB record for user 114 is the same as the amount of the quota shares reserved at quota node P 110 for quota node C1 111 (i.e., content of the ReservedShare [C1] field of the local quota DB record of quota node P 110 for user 114). Therefore, in the context of the present application, sometimes local second quota Limit1_cached associated with quota node C1 111 is referred to as reserved quota share Limit1_cached.

4) Quota node P 110 grants a quota delegation to quota node C1 111 and sends the first temporary quota DB record to quota node C1 111.
5) Quota node C1 111 receives the quota delegation and performs the following operations.

Quota node C1 111 retrieves the value of Limit1_cached from the first temporary quota DB record and caches it in the quota field of its local quota DB record (e.g., having a structure as shown in Table 2 above) for user 114 as the value of second quota Limit1_cached in the quota field. Thereby, the valid second quota Limit1_cached indicates quota node C1 111 has a quota delegation.

6) Now with the valid second quota Limit1_cached (i.e., a quota delegation being held), quota node C1 111 can continue the quota checking. Quota node C1 111 checks whether or not the amount of resources requested by user 114 exceeds second quota limit Limit1_cached.
   i. If the amount of resources requested by user 114 exceeds second quota limit Limit1_cached, quota node C1 111 sends to quota node P 110 a quota delegation adjustment request for adjusting second quota Limit1_cached in order to obtain a greater second quota, and re-conducts a quota check, as described below. The adjustment request also contains minimum and maximum share requested values. At this point, the minimum share requested value is a difference between the amount of resources requested by user 114 and second quota Limit1_cached in the quota field of the local quota DB record for the user at quota node C1 111, and the maximum share requested value is a difference between second quota Limit1_cached and first quota Limit0_cfg in the quota field of the local quota DB record for the user at quota node C1 111.
   ii. If the amount of resources requested by user 114 does not exceed second quota Limit1_cached, a check on the second quota Limit1_cached at quota node C1 111 is passed.
7) If any of the checks on first quota Limit0_cfg and second quota Limit1_cached fails, quota node C1 111 will deny the resource allocation request of user 114.
8) If both the checks on first quota Limit0_cfg and second quota Limit1_cached are passed, the following steps are performed.
   a. Quota node C1 111 will grant requested resources to user 114, and update its local quota DB record (e.g., having a structure as shown in Table 2) for user 114.
      i. Quota node C1 111 will subtract the amount of resources allocated to user 114 from the Limit0_cfg and Limit1_cached fields in the DB record.
      ii. Quota node C1 111 will add the amount of resources allocated to user 114 in the UseCount[S] field in the DB record to track the resource consumption.
   b. Quota node P 110 will not need to update its local quota DB record for user 114 beyond this.

Through the above process, the effectiveness of the system quota functionality will be guaranteed, and unnecessary inter-quota-node communications can be eliminated and system performance can be improved greatly.

In one embodiment of the present disclosure, determining whether the amount of requested resources exceeds a quota specified by the quota delegation for the first quota node includes determining whether the amount of requested resources exceeds a second quota in a quota field of the first quota node's local quota DB record for the user; and if the amount of requested resources exceeds the second quota, sending to the second quota node a first quota delegation adjustment request for adjusting the second quota, wherein the first quota delegation adjustment request includes at least an identifier of the user, a minimum share requested value and a maximum share requested value.

By taking the hierarchical quota system as shown in FIG. 1 as an example, detailed description is presented below for the process of quota delegation recall, quota delegation renewal, automatic quota delegation adjustment and quota delegation revocation that might be involved while adjusting the second quota of the first quota node.

Quota Delegation Recall

As a cache mechanism, the quota delegation can be recalled by the authorizer (i.e., an upper-layer quota node, such as the parent quota node). This could happen when the quota delegation is adjusted, the system administrator modifies the quota setting, the quota delegation is revoked, etc.

When a quota delegation recall takes place, the lower-layer quota node (e.g., the child quota node) must return its local quota DB information together with the quota delegation to the upper-layer quota node, and thus may be deprived of the power of self-decision-making about resource allocation.

For example, in FIG. 1, if the parent node P 110 recalls the quota delegation from its child quota node C1 111:

1) quota node P110 checks the DelegationFlag[C1] field of the quota DB record to determine that a quota delegation has been granted to quota node C1 111.
2) quota node P 110 sends a recall message to quota node C1 111.
3) quota node C1 111 creates a second temporary quota DB record, which may have the same structure as the first temporary quota DB record as shown in Table 3, where,
   a. Identifier field is the user identifier of user 114;
   b. Limit1_cached field is the quota shares reserved by quota node P 110 for quota node C1 111 (since quota node P 110 already has this information in the ReservedShare[C1] field of its local quota DB record for user 114, the Limit1_cached field can be ignored);
   c. UseCount field is the amount of resources allocated to user 114 on quota node C1 111 and all its associated child quota nodes (e.g., CC3 113); and in FIG. 1, this value is a sum of UseCount[S] and UseCount[CC3] in the local quota DB record of node C1 111 for user 114.
4) quota node C1 111 clears the Limit1_cached field in its local quota DB record for user 114, so as to indicate that it now has no quota delegation.
5) quota node C1 111 returns the second temporary quota DB record to quota node P 110.
6) quota node P 110 receives the second temporary quota DB record from quota node C1 111, and then performs the following steps.
   a. Quota node P 110 retrieves the value of UseCount in the second temporary quota DB record and uses it to update UseCount[C1] in the local quota DB record for user 114;
   b. Quota node P 110 subtracts the UseCount[C1] field from the ReservedShare[C1] field in its local quota DB record for user 114, and adds the residual value resulting from the subtraction back to the first quota Limit0_cfg and the second quota Limit1_cached in the quota field;
c. Quota node P 110 resets the local DelegationFlag [C1] field to be ungranted; and
d. Quota node P 110 clears the local ReserveShare[C1] field.

After the quota delegation has been recalled, the child quota node will for any further processing need to contact its parent quota node for any quota-related requests.

Quota Delegation Renewal

Quota delegation is associated with a lease. When the lease expires, the child quota node must renew its quota delegation proactively. The renewal message also includes the exchange of the temporary quota DB record as shown in Table 3.

For example consider FIG. 1. When quota node C1 111 needs to renew its lease about quota delegation with quota node P 110,
1) quota node C1 111 sends a renewal message with a second temporary quota DB record (e.g., having a structure as shown in Table 3) to quota node P 110, where,
   a. Identifier field is the user identifier of user 114;
   b. Limit1_cached field is the quota shares reserved by quota node P 110 for quota node C1 111 (since quota node P 110 already has this information in the ReservedShare[C1] field of its local quota DB record for user 114, so the Limit1_cached field can be ignored);
   c. UseCount field is the amount of resources allocated to user 114 on quota node C1 111 and all its associated child quota nodes (e.g., CC3 113); and in FIG. 1, this value is a sum of UseCount[S] and UseCount[CC3] in the local quota DB record of node C1 111 for user 114.
2) after quota node P 110 receives the renewal message,
   a. quota node P 110 checks the DelegationFlag[C1] field in its local quota DB record for user 114 to ensure that the DelegationFlag[C1] field is still valid, i.e. the quota delegation granted to quota node C1 111 is not revoked; and
   b. quota node P 110 retrieves the value of UseCount from the received second temporary quota DB record to update UseCount[C1] of its local DB record for user 114. The periodically updated UseCount information will be the basis of automatic quota adjustment, as will be described below.
3) If the renewal succeeds, then quota node P 110 returns a message to quota node C1 111, the message containing a first temporary quota DB record (e.g., having a structure as shown in Table 3), where,
   a. the Id and UseCount fields are the same as corresponding fields in the received second temporary DB record, so quota node C1 111 can ignore the two fields;
   b. the Limit_cached filed could be adjusted via the mechanism of automatic quota adjustment, as will be discussed below.
4) Quota node C1 111 receives from quota node P 110 the message containing the first temporary quota DB record. If the Limit_cached field in the received first temporary quota DB record is not same as the Limit_cached field of its local quota DB record for user 114, quota node C1 111 will update the value of the local Limit1_cached field with the value of the received Limit1_cached field. Thus the quota share reserved for quota node C1 111 is adjusted automatically.

Automatic Quota Delegation Adjustment

The quota share cached by the lower-layer quota node can be adjusted automatically, based on the global resource consumption statistics and quota settings. This can be triggered under several different circumstances as disclosed below.

I. Triggered by Resource Consumption

When a user keeps consuming resources on a specific lower-layer quota node and is running out of the quota share (Limit1_cached) reserved by the upper-layer quota for the lower-layer quota node via the quota delegation, or the amount of consumed resources reaches a predefined threshold (e.g., 80% of the quota share Limit1_cached) of the reserved quota shares (Limit1_cached), the lower-layer quota node will send a quota delegation adjustment request to the upper-layer quota node for larger quota shares.

Considering FIG. 1 as an example. If user 114 consumes a large number of resources on quota node C1 111 and is about to exhaust the quota share (Limit1_cached) reserved by quota node p 110 for quota node C1 111 via the quota delegation, the following operations may be performed.
1) Quota node C1 111 sends to quota node P 110 a quota delegation adjustment request for adjusting the second quota Limit1_cached, the quota delegation adjustment request containing at least an identifier of the user, a minimum share requested value and a maximum share requested value. The minimum share requested value is a minimum share value of the second quota Limit1_cached required to satisfy the user resource request (i.e., a difference between the amount of resources requested by the user and the second quota Limit1_cached in the local quota DB record for the user at quota node C1 111). The maximum share requested value is a difference between second quota Limit1_cached and first quota Limit0_cfg in the local quota DB record for the user. The quota delegation adjustment request may also contain a second temporary quota DB record (e.g., having a structure as shown in Table 3) in order to report to quota node P 110 the amount of resources allocated on quota node C1 111 and child node CC3 113.
2) Upon receiving the quota delegation adjustment request, quota node P 110 may perform the following operations.
   a. Quota node P 110 updates its local quota DB record UseCount[C1] field according to the received second temporary quota DB record, as a reference for adjusting the quota share reserved for quota node C1 111.
   b. Quota node P 110 checks DelegationFlag[C1] in its local quota DB record for user 114 to determine whether the status of the quota delegation of quota node C1 111 is valid:
      i. If the quota delegation has been unilaterally revoked by quota node P 110, quota node P 110 sends to quota node C1 111 a quota delegation revocation request, which will be discussed in "Quota Delegation Revocation" below; and
      ii. If the status of the quota delegation is granted, then the quota delegation adjustment request continues to be processed.

c. Since quota node P 110 has global information, including quota delegation granting, quota share division, and resource use count on each associated lower-layer node (that is updated periodically and described in "Quota Delegation Renewal"), quota node P 110 will attempt to spare more share for the requesting quota node C1 111, by one of the processes described below.
  i. If the second quota Limit1_cached can satisfy the quota adjustment request of quota node C1 111 (i.e., the second quota Limit1_cached is greater than or equal to the minimum share requested value in the quota adjustment request), then quota node P 110 allocates more share from local first quota Limit1_cfg and second quota Limit1_cached and grants it to requesting quota node C1 111;
  ii. If the second quota Limit1_cached cannot satisfy the quota adjustment request of quota node C1 111 (i.e., the second quota Limit1_cached is less than the minimum share requested value in the quota adjustment request), quota node P 110 may:
      check the local DelegationFlag[C1, C2, . . . ,Cn] field to determine whether there exist other child quota nodes holding a quota delegation; and/or
      make statistics on the amount of resources allocated on the other child quota node; and/or recall the granted quota delegation from one or more child quota nodes of the other child quota nodes according to the minimum share requested value of the quota adjustment request (the quota delegation recall process is as described in "Quota Delegation Recall"); and after recalling one or more quota delegations, the resource consumption of user 114 in the quota fields Limit0_cfg and Limit1_cached in the local quota DB record of quota node 110 for user 114 may be increased; and
      after quota node P 110 recalls all quota delegations except the quota delegation held by quota node C1 111, if the first quota Limit0_cfg still cannot satisfy the quota adjustment request of quota node C1 111, then user 114 may run out of resource quota, so quota node P 110 will reject the quota adjustment request of C1 111, and in turn, quota node C1 111 will reject the resource request of user 114.
  iii. After quota node P 110 recalls all quota delegations, if Limit0_cfg can satisfy the quota adjustment request, but Limit1_cached cannot satisfy the quota adjustment request of quota node C1 111, then quota node P 110 may send a quota delegation adjustment request for adjusting local second quota Limit1_cached to the upper-layer quota node (parent quota node) that is directly associated. After quota node P 110 retrieves adjusted (greater) second quota Limit1_cached from the directly-associated upper-layer quota node (parent quota node), if Limit1_cached can satisfy the quota adjustment request of quota node C1 111, then certain share is allocated from Limit0_cfg and second quota Limit1_cached is adjusted (greater) and then granted to child quota node C1 111.
  iv. If through the above steps, the second quota Limit1_cached still cannot satisfy the quota adjustment request of quota node C1 111, then quota node P 110 cannot find more quota share/allocation, the user is effectively exhausting its quota, and the user's resource allocation request must be denied.
3) If the above quota adjustment process succeeds, then the requesting quota node will get a renewed quota delegation with adjusted quota share.

With the renewed quota delegation and larger quota share, the requesting quota node can continue to make resource allocation decision by itself.

II. Triggered by Periodic Quota Delegation Renewal

The upper-layer quota node (e.g., parent quota node) may also initiate quota adjustment proactively. Associated lower-layer quota nodes (e.g. child quota nodes) may periodically renew their quota delegations and report resource consumption count on them to the upper-layer quota node, as described in "Quota Delegation Renewal". When the quota share/allocation division among child nodes (ReservedShare [C1, . . . Cn]) skews from the actual resource consumption count on child nodes (UseCount[C1, . . . Cn]) and exceeds a predefined threshold (e.g., 60%), the parent quota node may re-divide quota share among child quota nodes based on the actual resource consumption count on child quota nodes and renew quota delegations of corresponding child quota nodes with the new quota share.

To achieve this function, a quota DB record as shown in Table 2 should be further extended as illustrated in Table 4.

TABLE 4

| Id | Limit0_cfg, Limit1_cached | UseCount[S, C1, C2, . . . , Cn] | DelegationFlag[C1, C2, . . . , Cn] | ReservedShare[C1, C2, . . . , Cn] | MaxShare[C1, C2, . . . , Cn] |
| --- | --- | --- | --- | --- | --- |

Except the newly set field MaxShare[C1, C2, . . . , Cn], definitions of all other fields in Table 4 are the same as those in Table 2, and the newly set field MaxShare[C1, C2, . . . ,Cn] is set as a maximum share reserved value that is acceptable to a current child quota node holding a quota delegation.

While the parent quota node is adjusting the share of the quota delegation for the child quota node proactively, the share expanded for the child quota node must be less than or equal to MaxShare[C1, C2 , . . . , Cn], so as to prevent Limit1_cached in the corresponding quota DB record on the child quota node from being greater than Limit0_cfg and thus result in violating system constraints.

III. Triggered by Administrator Quota Setting

When the first quota Limit0_cfg is modified by the administrator on the parent quota node, the share adjustment of the child quota node or its own quota delegation might be triggered.

Let Limit0_cfg_originally be representing:
  i) a value of Limit0_cfg in a relevant quota DB record before the administrator modifies the setting, plus ii) a sum of shares reserved for quota delegations of all child quota nodes (i.e., a sum of sub-fields of child nodes holding quota delegations among ReservedShare [C1, C2, . . . , Cn]), plus iii) a sum of resources consumed by a relevant user on the current parent node and all child quota nodes without quota delegations (i.e., a sum of sub-fields of child nodes without quota delegations and parent node among UseCount[S,C1, C2, . . . , CN].)

Let Limit1_cached_original be:

i) a value of Limit1_cached in a current relevant user DB record, plus ii) a sum of shares reserved for quota delegations of all child quota nodes (i.e., a sum of sub-fields of child nodes holding quota delegations among ReservedShare [C1, C2, . . . , Cn]), plus iii) a sum of resources consumed by a relevant user on the current parent node and all child quota nodes without quota delegations (i.e., a sum of sub-fields of child nodes without quota delegations and parent node among UseCount[S,C1, C2, . . . , CN].)

When the administrator modifies the first quota Limit0_cfg on the parent quota node, and the parent quota node holds a quota delegation, i.e., then Limit1_cached is valid, and the parent quota node might also have to proactively adjust the share reserved for the child quota node or its own quota delegation. There may exist the following two different cases:

1) If the first quota Limit0_cfg newly set by the administrator is less than Limit0_cfg_original, then
   a. If newly set Limit0_cfg is less than Limit0_cfg_original, then
      i. the parent quota node needs to adjust and even recall quota delegations of one or more child quota nodes, and reduce the share reserved for quota delegations of child nodes, so that the sum of the sum of the adjusted share reserved for quota delegations of child nodes and resources consumed by a relevant user on the current parent node and all child quota nodes without quota delegation is less than or equal to Limit0_cfg newly set by the administrator; after recalling quota delegations of all child nodes, if the sum of all sub-fields of UseCount[S,C1, C2, . . . , Cn] in the quota DB record for a relevant user at the current node is still greater than Limit0_cfg newly set by the administrator, then the user has exhausted resources on the parent node; and
      ii. the parent node needs to send a quota delegation adjustment request to its further parent node for reducing the shares reserved for its quota delegation, so that the share Limit1_cached reserved for the parent quota node is less than or equal to Limit0_cfg newly set by the administrator.
   b. If the newly set Limit0_cfg is greater than or equal to Limit1_cached_original, then the parent quota node may not require any need to adjust quota delegations of its child quota nodes.

2) If the first quota Limit0_cfg newly set by the administrator is greater than or equal to Limit1_cached_original, with reference to the relevant user's Limit1_cached field, UseCount[S,C1, C2, . . . , Cn] field and ReservedShare[C1, C2, . . . , Cn] field in the quota DB record of the parent node, the parent quota node may (not necessarily) proactively adjust quota delegations of its quota nodes so that the share/allocation of quota delegations of child quota nodes is balanced with the user's resource use count on itself If the quota DB record uses an enhanced quota DB record as shown in Table 4, when the administrator modifies the first quota Limit0_cfg on the parent quota node and the parent quota node holds a quota delegation, i.e., its Limit1_cached is valid, the parent quota node also might have to send a quota delegation adjustment request to its next parent node so as to update the MaxShare[C1, C2, . . . , Cn] field in the quota DB record of its further parent node.

IV. Triggered by Automatic Quota Adjustment

Automatic quota adjustment can iteratively trigger automatic quota adjustment. As described above, when a certain parent quota node receives a quota delegation adjustment request from a child quota node and a minimum share requested value requested by the quota delegation adjustment request is less than or equal to the first quota Limit0_cfg and greater than the second quota field Limit1_cached in the parent quota node's quota DB record, the parent quota node may be required to send a quota delegation adjustment request to its next parent quota node for requesting greater share.

After the parent quota node's quota delegation adjustment request is responded successfully, the second field Limit1_cached in the parent quota node's local quota DB record for the user is increased, i.e., part of shares can be reserved to respond to a quota delegation adjustment request of an associated quota node as received by the parent quota node.

V. Triggered by Revoked Quota Delegation

As described in "Quota Delegation Revocation" below, when a child quota node holding a revoked quota delegation is back online again, the parent quota node (first parent node), according to the amount of resource consumption reported by the child quota node, may be required to send to its next parent node (second parent node) a quota delegation adjustment request for requesting greater share, so that the first quota Limit0_cfg, second quota Limit1_cached and resource use count UseCount[S,C1, C2, . . . , Cn] fields in the local quota DB record of the parent quota node (first parent node) for the user satisfy constraints defined by the system and the system integrity is restored.

Quota Delegation Revocation

Quota delegation can be revoked. This may happen when the parent node is recalling the quota delegation or the quota delegation lease is expiring and needs to be refreshed, and for some reason (e.g., network disconnection, or child quota node connection failure), the child quota node cannot be reached, then the parent node may revoke the quota delegation unilaterally.

When parent quota Node P 110 is revoking the quota delegation from child quota node C1 111, parent quota node P 110 needs to restore its local quota DB record.

1) Quota node P 110 will add ReservedShare[C1], from which UseCount[C1] has been subtracted, back to Limit0_cfg and Limit1_cached, appearing that no quota delegation has ever been granted to child quota Node C1 111.

2) Quota node P 110 will set DelegationFlag[C1] as revoked, indicating that the quota delegation of quota node C1 111 has been revoked by quota node P 110 unilaterally. This flag will help verify and restore the system integrity damaged by the quota delegation of quota node C1 111 when quota node C1 111 111 is back online.
3) Quota node P 110 will clear the field ReserveShare [C1].
4) Quota node P 110 will retain the field UseCount[C].

When quota node C1 111 is back online, quota node P 110 sends a quota delegation revocation request to child quota node C1 111:
1) after receiving the quota delegation revocation request, quota node C1 111 may be configured to
   a. recall quota delegations that are granted to all its child quota nodes;
   b. reset the second field Limit1_cached as invalid in its local quota DB record for the user;
   c. create a temporary quota DB record that contains at least an identifier of the user and the total amount of resource consumption of the user on quota node C1 111 and all associated child nodes; and
   d. send a quota delegation revocation response to quota node P 110 which contains the temporary quota DB record.
2) After receiving the quota delegation revocation response, quota node P 110 may be configured to
   a. use the total amount of resource consumption of the user on quota node C1 111 and all associated child nodes as contained in the received temporary quota DB record to revise the fields Limit0_cfg, Limit1_cached and UseCount[C1] in the local quota DB record for the user;
   b. reset the field DelegationFlag[C1] as ungranted;
   c. if quota node P 110 has no quota delegation, a temporary quota DB record with a structure as shown in Table 3 may be sent to its parent quota node for revising resource allocation information of the user;
   d. if the revised Limit0_cfg has a negative value, then the user has exhausted the shares on quota node P 110 and C1 111; and
   e. if the revised Limit0_cfg is greater than 0 and the revised Limit1_cached is a negative value and quota node P 110 has recalled all quota delegations, then quota node P 110 needs to send a quota delegation adjustment request to its parent node for obtaining a greater quota delegation share.

After the quota delegation of quota node C1 111 is revoked, the node will have to request a new quota delegation as needed.

Figure 4:
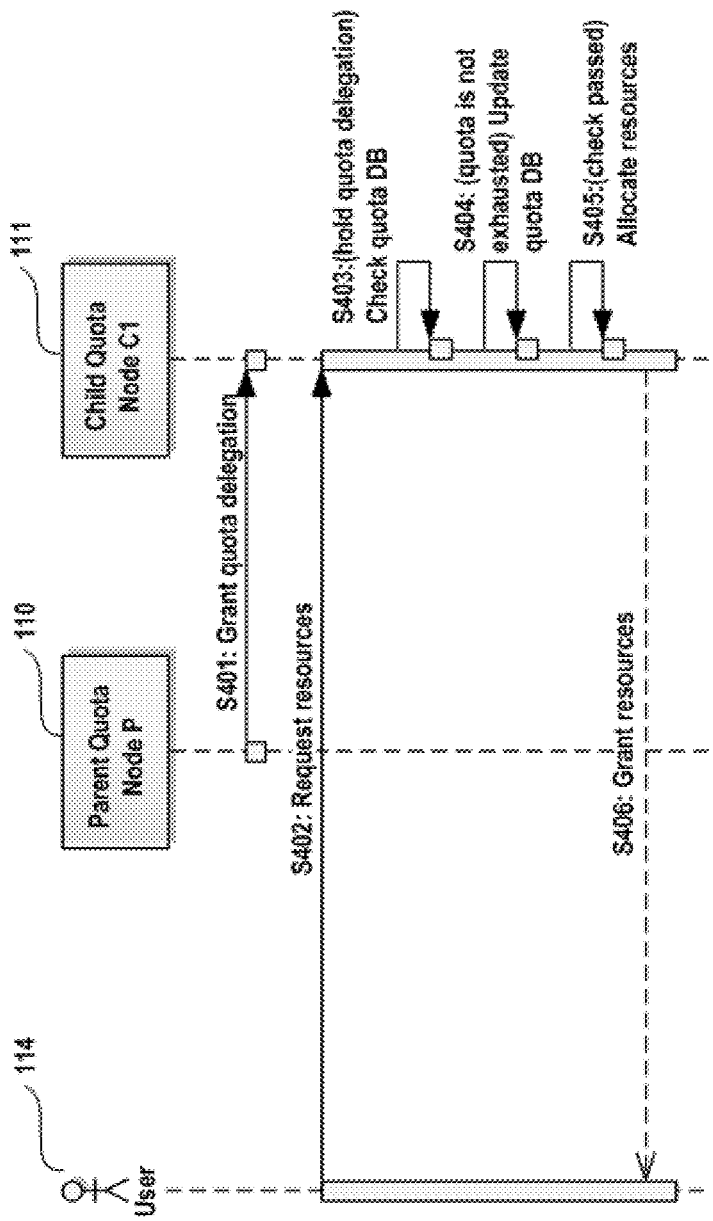
FIG. 4 shows an exemplary sequence diagram of a method for managing resource allocation in a hierarchical quota system according to one specific embodiment of the present disclosure.

FIG. 4 is a sequence diagram of an exemplary method 400 for managing resource allocation in a hierarchical quota system according to one specific embodiment of the present disclosure. In the embodiment shown in FIG. 4, suppose the hierarchical quota system uses a tree architecture as shown in FIG. 1, user 114 requests child quota node C1 111 to allocate resources. In step S401, parent quota node P 110 grants a quota delegation to child quota node C1 111 at a certain moment. In step S402, user 114 sends a resource allocation request to quota node C1 111 for requesting quota node C1 111 to allocate resources to himself.

In step S403, quota node C1 111 checks its local quota DB to look up a quota DB record for user 114. After finding the quota DB record for user 114, the following operations may be performed at quota node C1 111:
checking first quota Limit0_cfg to determine whether or not the amount of requested resources exceeds first quota Limit0_cfg set at quota node C1 111 by the system administrator; if not, then further determining whether or not there exists a quota delegation for quota node C1 111, i.e., checking whether or not there exists valid second quota Limit1_cached; if yes, then further determining whether or not the amount of requested resources exceeds second quota Limit1_cached specified for the quota delegation of quota node C1 111; if not, then proceeding to step S404 where quota node C1 111 updates the field UseCount[P] in its local quota DB record for tracking resource consumption of user 114, and subtracting the amount of resources allocated to user 114 from the fields Limit0_cfg and Limit1_cached in the local quota DB record.

In step S405, quota node C1 111 allocates the amount of requested resources to user 114 without a need to contact a directly associated upper-layer quota node for resource allocation decision-making.

In step S406, quota node C1 111 grants requested resources to user 114.

Figure 5:
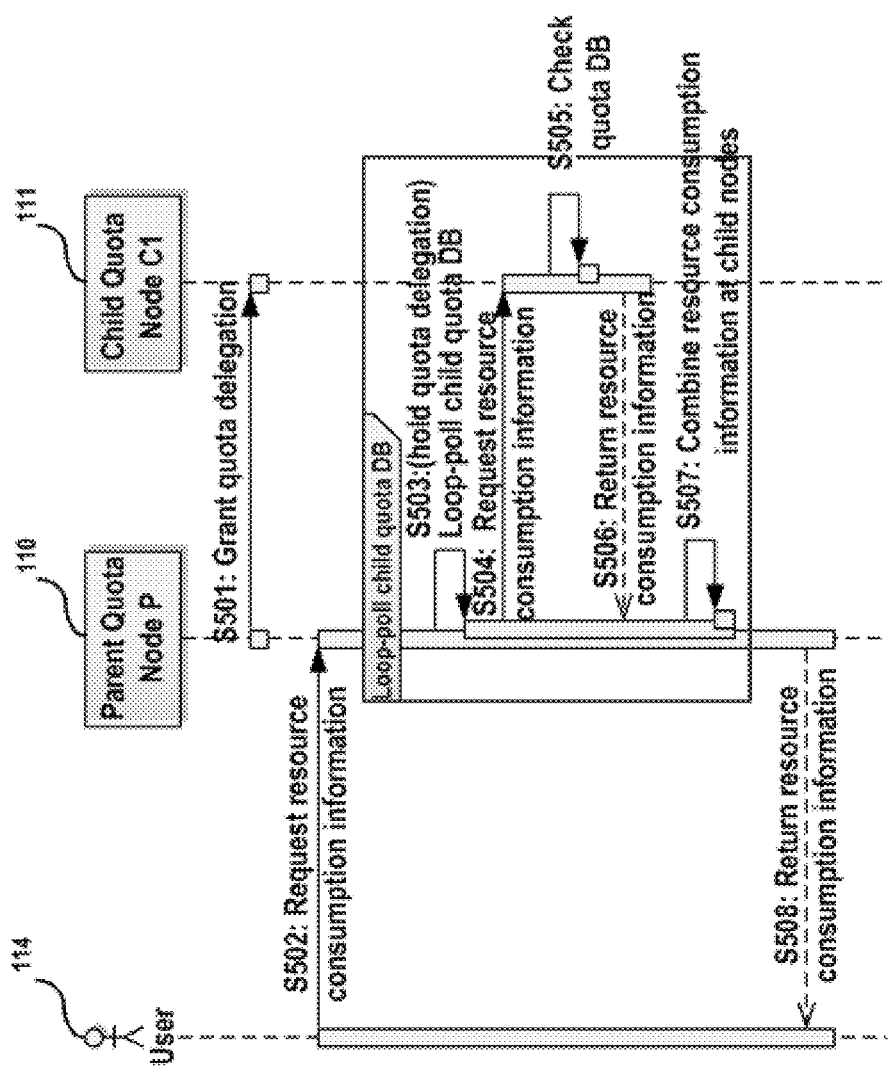
FIG. 5 shows an exemplary sequence diagram of the quota reporting process according to one specific embodiment of the present disclosure.
Figure 6:
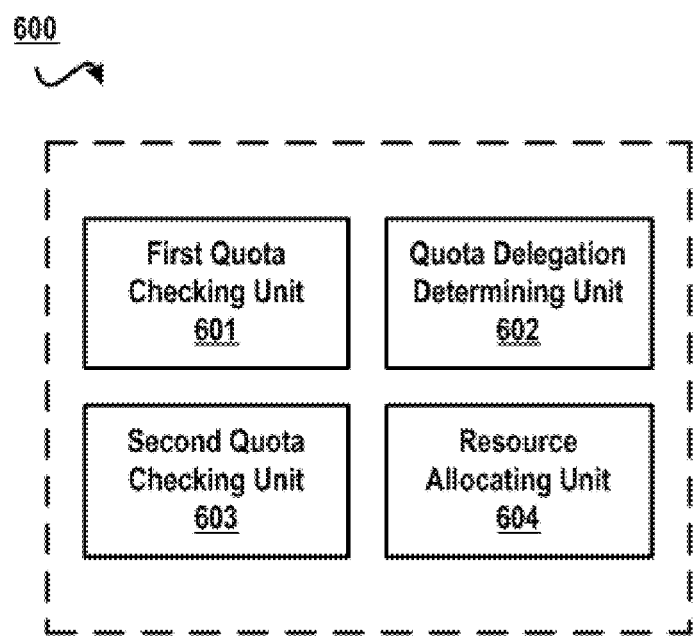
FIG. 6 shows a block diagram of an exemplary apparatus for managing resource allocation in a hierarchical quota system according to one embodiment of the present disclosure.

FIG. 5 is a sequence diagram of an exemplary quota reporting process 500 according to one specific embodiment of the present disclosure. Quota reporting process 500 may be used for tracking resource consumption on a quota node. The embodiment of FIG. 5, supposses that the hierarchical quota system still uses a tree architecture as shown in FIG. 1, and parent quota node P 110 grants a quota delegation to child quota node C1 111.

In step S501, parent quota node P 110 grants a quota delegation to child quota node C1 111 at a certain moment.

In step S502, when user 114 wants to retrieve the pertaining resource consumption statistical information inside a certain hierarchical quota system, since any quota node has quota information on itself and associated lower-layer quota nodes, which includes granting information of quota delegations, division information of quota shares, and resource consumption information on each associated lower-layer node (the information is periodically updated, as described in "quota delegation renewal"), resource consumption statistical information pertaining to a certain user on a certain quota node and all associated child nodes can be queried on the quota node. For example, in the hierarchical quota system shown in FIG. 1, user 114 may query quota node P 110 for resource consumption statistical information of the user on a quota node tree with node P 110 being the root.

In step S503, parent quota node P 110 checks whether or not a quota delegation has been granted to the child quota node. If yes, then parent quota node P 110 may be required to poll the child quota node with a quota delegation in order to retrieve resource consumption information on the child quota node with a quota delegation, because resource consumption information on the child quota node as saved in the local quota DB (UseCount[S,C1, . . . , Cn] of parent quota node P 110 is not synchronous in real time with actual resource consumption information on the child quota node. In other words, if the child (lower-layer) quota node holds a quota delegation, then corresponding sub-fields (UseCount[C1], UseCount[C2], . . . UseCount[Cn]) in the resource use count field of the parent quota node's local quota DB record for the user may not be updated in real time.

In step S504, parent quota node P 110 queries the child quota node with a quota delegation for resource consumption information.

In step S505, the child quota node with a quota delegation checks its local quota DB (the field UseCount[S]).

In step S506, the child quota node with a quota delegation reports resource consumption information to parent quota node P 110, e.g., by sending a second temporary quota DB record having a structure as shown in Table 3.

In step S507, parent quota node P 110 summarizes resource consumption information reported by the child quota node, i.e., the user's resource consumption statistical information on the quota node tree with P 110 being the root.

In step S508, parent quota node P 110 reports the resource consumption statistical information to user 114.

Figure 2:
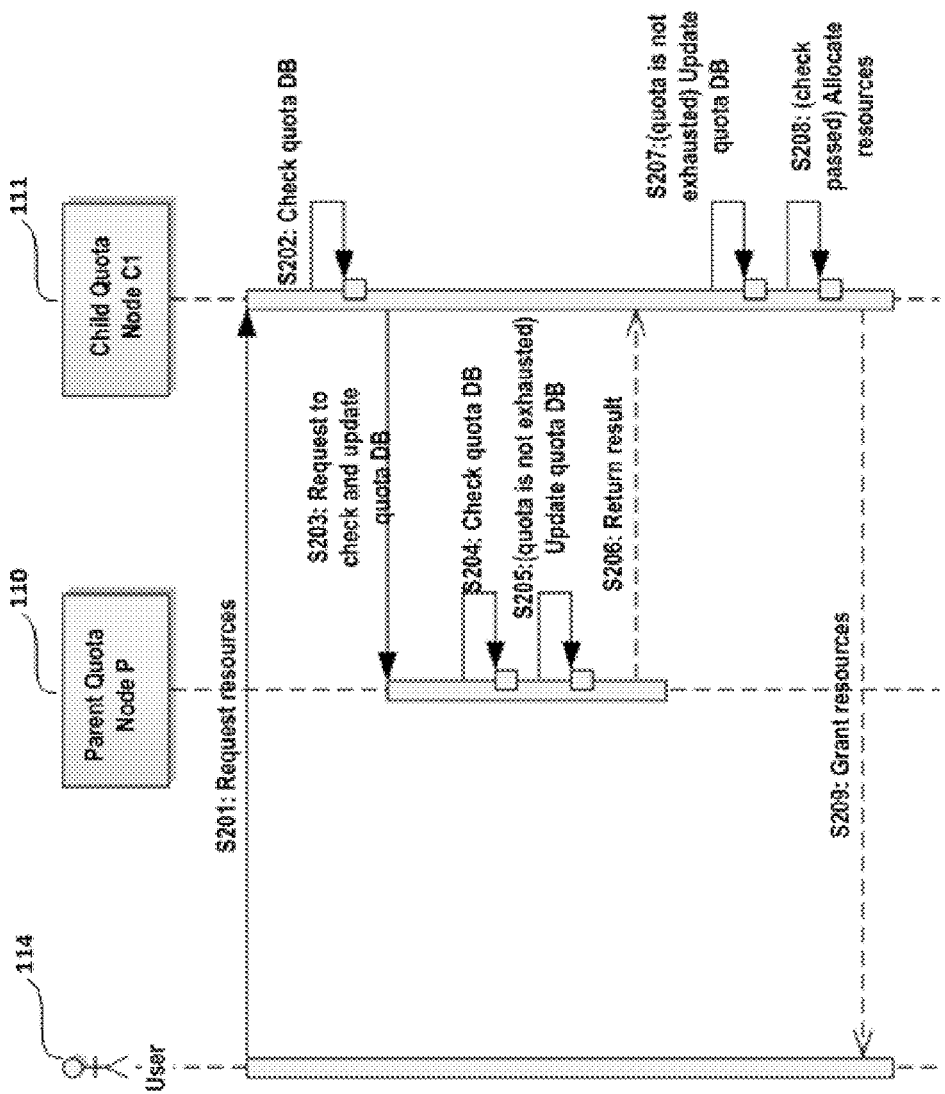
FIG. 2 shows an exemplary sequence diagram of an existing method for resource allocation in a hierarchical quota system.

It should be understood that for the purpose of simplifying illustration, FIG. 5 only shows one child quota node C1 111 of parent quota node P 110. However, in normal circumstances, parent quota node P 110 may granted quota delegations to multiple child quota nodes (e.g., child quota node C1 111 and child quota node C2 112 in FIG. 2) and child quota nodes might further grant quota delegations to their child nodes (e.g., child quota node C1 111 and its child node CC3 113 in FIG. 1). In order to retrieve resource consumption statistical information within the hierarchical quota system, steps S502 to S506 are performed by quota node P 110 and quota node C1 111 on child quota node C2 112 and child quota node CC3 113, respectively.

According to another aspect of the present disclosure, there is further provided an apparatus for managing resource allocation in a hierarchical quota system. The hierarchical quota management system comprises n layers of quota nodes from top to bottom, n being a positive integer greater than 1. The apparatus 600 comprises: a first quota checking unit 601 configured to, at a first quota node in an $i^{th}$ layer of quota nodes, in response to receiving a resource allocation request from a user, determine whether an amount of requested resources exceeds a first quota set for the first quota node by a system administrator, wherein i is a positive integer that is more than 1 and less than or equal to n; a first quota delegation checking unit 602 configured to, if the amount of requested resources does not exceed the first quota, determine whether the first quota node holds a quota delegation for the first node; a second quota checking unit 603 configured to, if the first quota node holds the quota delegation for the first quota node, determine whether the amount of requested resources exceeds a second quota specified by the quota delegation for the first quota node; and a resource allocating unit 604 configured to, if the amount of requested resources does not exceed the second quota specified by the quota delegation for the first quota node, allocate the requested resources to the user. In one embodiment, the apparatus 600 may comprise a single quota unit (not shown in the Fig.), which includes first quota checking unit 601, first quota delegation unbit 602, second quota checking unit 603 and resource allocating unit 604, wherein the single quota performs the tasks associated with the separate unit for managing resource allocation in a hierarchial quota system efficiently and effectively.

Note that the various embodiments of the present disclosure provide a method, a computer program product and apparatus for managing resource allocation in a hierarchical quota system. Although the various embodiments have been described with reference to a specific architecture of the hierarchical quota system, and this should not be construed as a limitation of an application environment of the various embodiments of the present disclosure. For example, the embodiments of the present disclosure may be applied in a hierarchical quota system with other hierarchical architecture.

The present disclosure may be implemented in software, hardware or combination of software and hardware. In a preferred embodiment, the present disclosure may be implemented as software, including, without limitation to, firmware, resident software, micro-code, etc.

Moreover, the present disclosure may be implemented as a computer program product accessible by computer useable or readable media that provide program code for use by or in connection with a computer or any instruction executing system. For the purpose of description, a computer-usable or computer-readable medium may be any tangible means that can contain, store, communicate, propagate, or transport the program for use by or in connection with an instruction execution system, apparatus, or device.

The medium may be an electric, magnetic, optical, electromagnetic, infrared, or semiconductor system (apparatus or device), or propagation medium. Examples of the computer-readable medium would include the following: a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CR-ROM), and DVD.

A data processing system adapted for storing and/or executing program code would include at least one processor that is coupled to a memory element directly or via a system bus. The memory element may include a local memory usable during actually executing the program code, a mass memory, and a cache that provides temporary storage for at least one portion of program code so as to decrease the number of times for retrieving code from the mass memory during execution.

An Input/Output or I/O device (including, without limitation to, a keyboard, a display, a pointing device, etc.) may be coupled to the system directly or via an intermediate I/O controller.

A network adapter may also be coupled to the system such that the data processing system can be coupled to other data processing systems, remote printers or storage devices via an intermediate private or public network. A modem, a cable modem, and an Ethernet card are merely examples of a currently available network adapter.

It is to be understood from the foregoing description that many modifications and variations will be made to the various embodiments of the present disclosure without departing from the real spirit of the present disclosure. The description in this specification is only for illustration and should not be construed as limiting. The scope of the present disclosure is only defined by the claims as appended.

What is claimed is:

1. A method for managing resource allocation in a hierarchical quota system, using one or more processors and memory, the hierarchical quota system comprising 'n' layers of quota nodes from top to bottom, n being a positive integer greater than 1, the method comprising:

at a first quota node in an $i^{th}$ layer of quota nodes, in response to receiving a resource allocation request from a user, determining whether an amount of requested resources exceeds a first quota defined by an administrator at the first quota node, wherein 'i' is a positive integer greater than 1 and less than or equal to n;

if the amount of requested resources does not exceed the defined first quota, determining whether the first quota node supports a quota delegation for the first quota node;

if the first quota node supports the quota delegation, determining whether the amount of requested resources exceeds a second quota specified by the quota delegation for the first quota node; and if the amount of requested resources does not exceed the specified second quota, allocating the requested resources to the user;
if the first quota node does not support the quota delegation, creating a first quota delegation request for obtaining the quota delegation, the first quota delegation request comprising at least:
an identifier of the user,
a first minimum share requested value, and
a first maximum share requested value,
wherein the first minimum share requested value indicating the amount of requested resources by the user, and the first maximum share requested value indicating the first quota;
sending the defined first quota delegation request to a second quota node in an $i^{th}$-1 layer of quota nodes directly associated with the first quota node;
(a) in response to receiving the resource allocation request, determining whether the second quota node supports the quota delegation for the second quota node;
(b) if the second quota node does not support the quota delegation for the second quota node, sending a quota delegation request for obtaining the quota delegation for the second quota node to a third quota node in an $i^{th}$-2 layer of quota nodes directly associated with the second quota node;
(c) if the second quota node supports the quota delegation for the second quota node, sending a response to the first quota node to grant the quota delegation for the first quota node;
wherein determining whether the second quota node has the quota delegation for the second quota node comprises:
looking up a quota database record for the user at the second quota node to determine whether a quota field of the quota database record for the user comprises a valid second quota;
determining whether the amount of requested resources by the user exceeds a defined first quota specified by the quota delegation for the first quota node by:
determining whether the amount of requested resources exceeds the specified second quota in the quota field of the quota database record for the user at the first quota node;
if the amount of requested resources exceeds the specified second quota, determining whether the defined first quota node has granted quota delegations to each of the quota nodes in an $i^{th}$+1 layer of quota nodes directly associated with the first quota node;
if the first quota node does not grant the quota delegation to each the quota nodes in the $i^{th}$+1 layer of the quota nodes, sending from the first quota node to the second quota node a first quota delegation adjustment request for adjusting the second quota; the first quota delegation adjustment request comprising at least:
an associated identifier of the user;
a second minimum share requested value;
a second maximum share requested value;
wherein the second minimum share requested value is a difference between the amount of requested resources by the user and the specified second quota in the quota field of the quota database record for the user at the first quota node, and the second maximum share requested value is a difference between the specified second quota and the defined first quota in the quota field of the quota database record for the user at the first quota node;
wherein in response to receiving the first quota delegation adjustment request, the second quota node is configured for:
(d) checking a delegation flag field in the quota database record for the user at the second quota node to determine a status of the quota delegation for the first quota node;
(e) if the status of the quota delegation for the first quota node is granted, checking whether the specified second quota in the quota field of the quota database record for the user at the second quota node is greater than or equal to the second minimum share requested value requested by the first quota delegation adjustment request;
(f) if the status of the quota delegation for the first quota node is revoked, sending a first quota delegation revocation request to the first quota node, the first quota delegation revocation request comprising the identifier of the user;
if the specified second quota in the quota field of the quota database record for the user at the second quota node is greater than or equal to the second minimum share requested value, at the second quota node:
amending shares reserved for the first quota node for the first quota delegation adjustment request from the specified second quota and the first quota in the quota field in the quota database record for the user;
adding the reserved shares to a sub-field for the first quota node in a reserved shares field of the quota database record; and
sending to the first quota node a response to the first quota delegation adjustment request, the response comprising at least the shares reserved for the first quota node.

2. The method according to claim 1, wherein the allocating requested resources to the user comprises:
subtracting an amount of allocated resources from the defined first quota and the specified second quota thereby updating the defined first quota and the specified second quota; and
updating the amount of allocated resources to the user.

3. The method according to claim 1, wherein step (b) is executed iteratively until a quota node in a first layer of the quota nodes is associated with the second quota node; and
wherein the quota nodes in the first layer amend, in response to quota delegation requests from the respective quota nodes in a second layer of quota nodes associated with the quota nodes in the first layer, shares requested by quota delegation requests from the defined first quota.

4. The method according to claim 3, wherein the quota database record for a respective user is maintained at each quota node in the n layer of quota nodes, the quota database record comprising at least:
a user identifier field configured to identify the respective user to which the quota database record corresponds;
the quota field comprising the defined first quota set by the administrator and the second quota specified by the quota delegation for the first quota node, the specified second quota being less than or equal to the defined first quota;
a resource use count field configured to indicate an amount of resources allocated on a current quota node and the respective quota nodes in a lower layer associated with the current quota node;
the delegation flag field configured to indicate whether a respective quota delegation has been granted to each of the quota node of the respective quota nodes in the lower layer directly associated with the current quota node, and status of the respective quota delegation; and a reserved share field configured to indicate the shares reserved for each of the quota nodes in the lower layer supporting the quota delegation in the defined first quota and the specified second quota.

5. The method according to claim 4, wherein the status of the respective quota delegation comprises one of ungranted status, granted status and revoked status.

6. The method according to claim 1, further comprises:
if determining the quota field of the quota database record for the user at the second quota node comprises the valid second quota, amending the shares reserved for the first quota node from the defined first quota and the specified second quota, the amended shares reserved being greater than or equal to the first minimum share requested value and less than or equal to the first maximum share requested value.

7. The method according to claim 6, further comprises:
creating a first temporary quota database record, wherein the first temporary quota database record comprising at least:
the identifier of the user;
the shares reserved for the first quota node; and
sending the first temporary quota database record to the first quota node.

8. The method according to claim 7, further comprising:
in response to receiving the first temporary quota database record, caching the amended shares reserved for the first quota node in the quota field of the quota database record for the user as the specified second quota for the quota field.

9. The method according to claim 8, further comprising:
if the specified second quota in the quota field of the quota database record for the user at the second quota node is less than the second minimum share requested value, recalling quota delegations from at least one or more quota nodes other than the defined first quota node in the lower layer of the quota nodes directly associated with the second quota node, until the specified second quota is greater than or equal to the second minimum share value.

10. The method according to claim 9, wherein the recalling the quota delegation from the at least one or more quota nodes in the lower layer directly associated with the second quota node comprises:
sending a first quota delegation recalling request from the second quota node to a fourth quota node in the lower layer of the quota nodes directly associated with the second quota node.

11. The method according to claim 10, further comprising:
in response to receiving the first quota delegation recalling request, performing at the fourth quota node:
checking the delegation flag field in the quota database record for the user at the fourth quota node to determine whether recalled respective quota delegations have been granted to the at least one or more quota nodes in the lower layer of quota nodes;
if the recalled respective quota delegations have been granted to the at least one or more quota nodes in the lower layer, recalling all the respective quota delegations;
resetting as invalid the specified second quota in the quota field of the quota database record for the user at the fourth quota node; and
sending a quota delegation recalling response to the second quota node, the quota delegation recalling response comprising at least a total amount of resources consumed by the user on the fourth quota node and all child nodes associated therewith.

12. The method according to claim 11, further comprising:
in response to receiving the quota delegation recalling response, updating, by the second quota node, the quota database record for the user at the second quota node, comprising:
updating a total amount of resource consumption contained in the quota delegation recalling response to sub-fields corresponding to the fourth quota node in a resource use count field of the quota database record for the user; and
adding shares reserved for a quota delegation for the fourth quota node, from which the total amount of resource consumption has been subtracted, to the defined first quota and the specified second quota in the quota field of the quota database record for the user at the second quota node.

13. The method according to claim 10, further comprising:
recalling, by the second quota node, all the quota delegations other than the quota delegation held by the first quota node from the quota nodes in the lower layer directly associated with the second quota node;
determining whether the specified second quota in the quota field of the quota database record for the user at the second quota node is less than the second minimum share requested value; and
if the specified second quota is less than the second minimum share requested value, checking the defined first quota of the quota field in the quota database record for the user at the second quota node.

14. The method according to claim 13, further comprising:
(g) if the defined first quota is less than the second minimum share requested value requested by the first quota delegation adjustment request, rejecting the first quota delegation adjustment request; and
(h) if the defined first quota is greater than or equal to the second minimum share requested value requested by the first quota delegation adjustment request, sending a second quota delegation adjustment request from the second quota node to the third quota node in the $i^{th}$-2 layer of quota nodes directly associated with the second quota node.

* * * * *